(No Model.) 3 Sheets—Sheet 1.
L. BOCK, Jr.
ELECTRIC MOTOR.
No. 440,821. Patented Nov. 18, 1890.
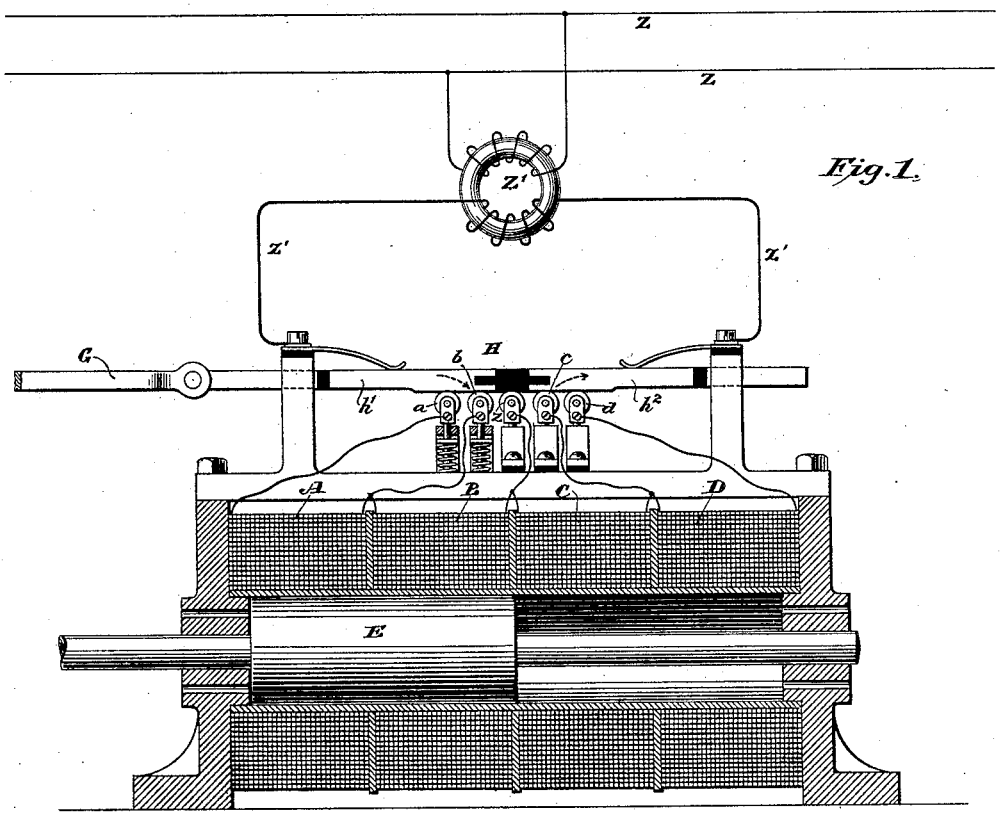
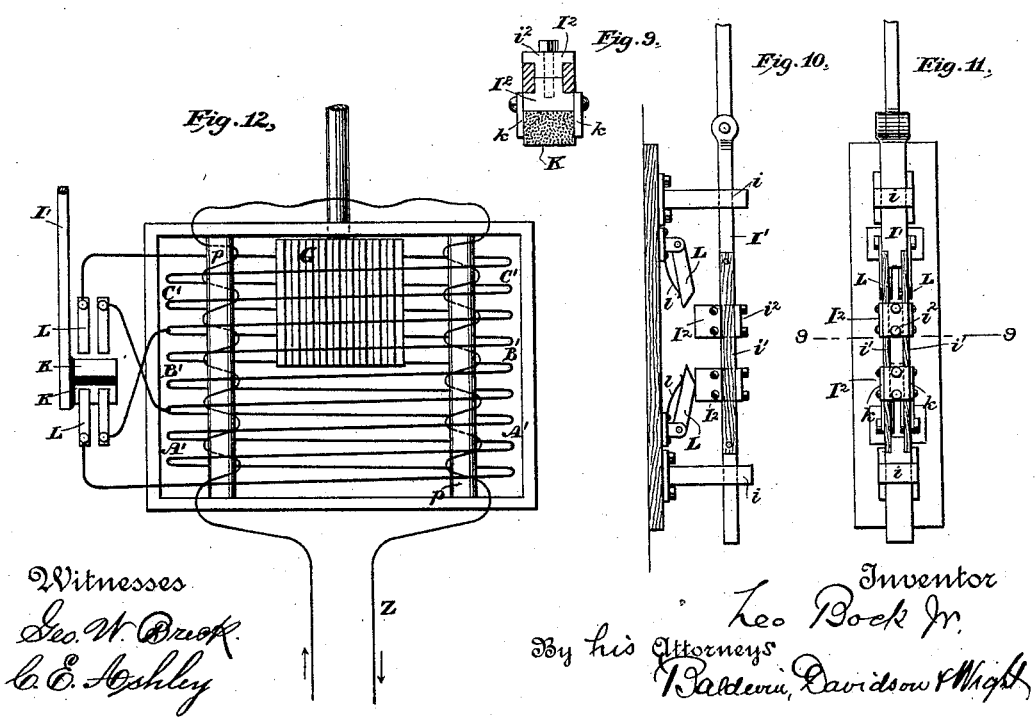
Witnesses
Geo. W. Breck
C. E. Ashley
Inventor
Leo Bock Jr.
By his Attorneys
Baldwin, Davidson & Wight
THE NORRIS PETERS CO., PHOTO-LITHO., WASHINGTON, D. C.

(No Model.) 3 Sheets—Sheet 2.

L. BOCK, Jr.
ELECTRIC MOTOR.

No. 440,821. Patented Nov. 18, 1890.

Witnesses
Geo. W. Breck.
C. E. Ashley.

Inventor
Leo Bock Jr.
By his Attorneys
Baldwin, Davidson & Wight (No Model.) 3 Sheets—Sheet 3.
L. BOCK, Jr.
ELECTRIC MOTOR.

No. 440,821. Patented Nov. 18, 1890.

Witnesses
Geo. W. Breck.
C. E. Ashley

Inventor
Leo Bock Jr.
By his Attorneys
Baldwin, Davidson & Wight

UNITED STATES PATENT OFFICE.

LEO BOCK, JR., OF NEW YORK, N. Y., ASSIGNOR, BY DIRECT AND MESNE ASSIGNMENTS, TO HIMSELF AND CHARLES L. WRIGHT, OF SAME PLACE.

ELECTRIC MOTOR.

SPECIFICATION forming part of Letters Patent No. 440,821, dated November 18, 1890.

Application filed August 20, 1889. Serial No. 321,339. (No model.)

*To all whom it may concern:*

Be it known that I, LEO BOCK, Jr., of New York, in the county and State of New York, have invented certain new and useful Improvements in Electric Motors, of which the following is a specification.

The purpose of my invention is to provide a motor to be operated by an alternating current.

With this end in view I employ a reciprocating motor operated by a series of solenoids with a converter for reducing high-tension alternating current, the coils or solenoids of the motor being in the secondary circuit of the converter.

The subject-matter claimed is hereinafter specified.

Figure 2:
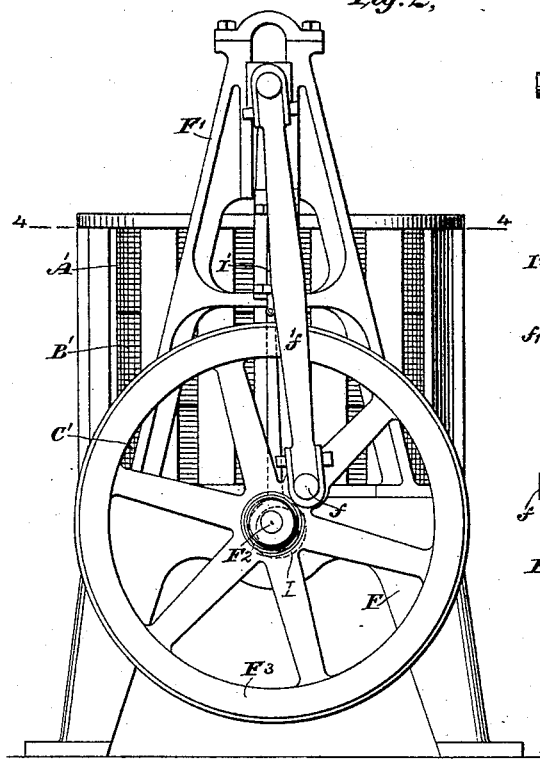
Figure 3:
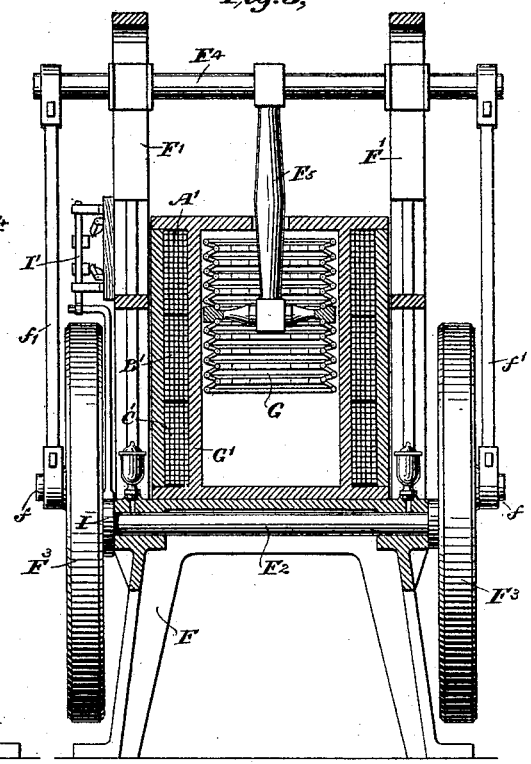
Figure 4:
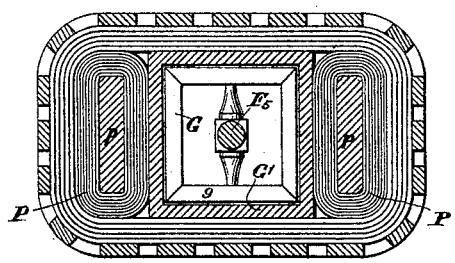
Figure 5:
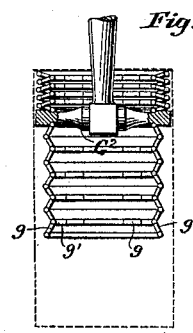
Figure 6:
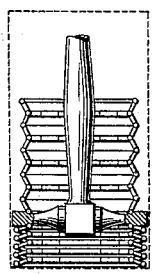
Figure 7:
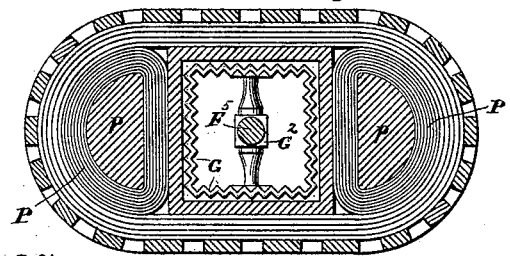
Figure 8:
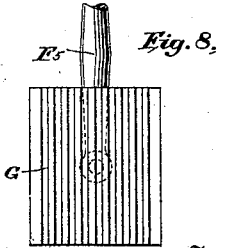
Figure 13:
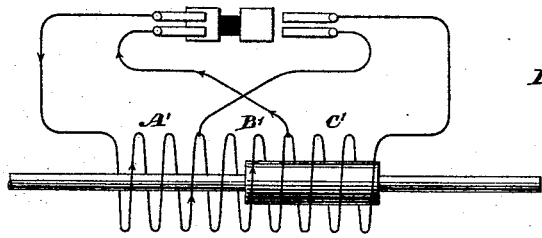
Figure 14:
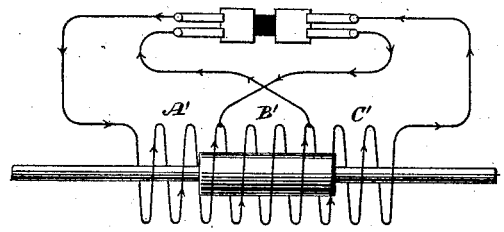
Figure 15:
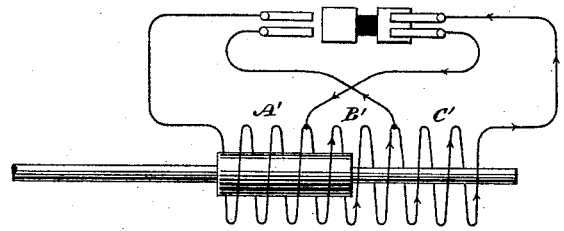
Figure 16:
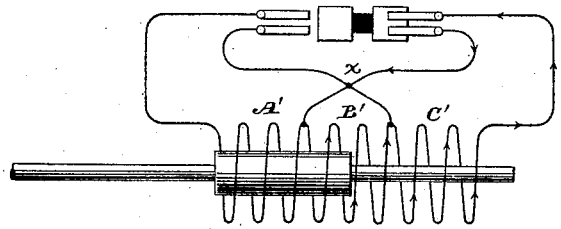
Figure 17:
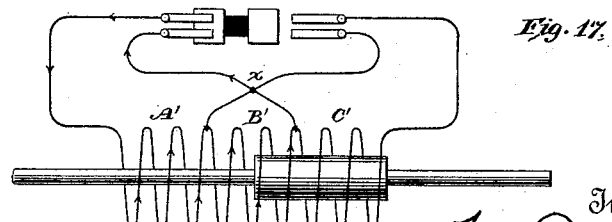

In the accompanying drawings, Figure 1 is a longitudinal sectional view of a horizontally-reciprocating electric motor included in the secondary of a converter whose primary is connected with the leads of an alternating circuit; Fig. 2, a side elevation of a vertically-reciprocating electric motor in which both the primary and secondary windings are within the machine; Fig. 3, a vertical section through the same; Fig. 4, a transverse section on the line 4 4, Fig 2. Figs. 5 and 6 are detailed views showing the expansible and collapsible armature in different positions; Fig. 7, a sectional view similar to Fig. 4, showing a slightly-modified construction. Fig. 8 is a detail elevation of the armature shown in Fig. 7. Figs. 9, 10, and 11 are detail views of the switch or contact mechanism, Fig. 9 being a cross-section of Fig. 11 on the line 9 9. Fig. 12 is a diagram view indicating the primary and secondary circuits and switch mechanism. Figs. 13, 14, and 15 are diagrams showing the switch mechanism and solenoids in the secondary circuit with the reciprocating armature in different positions. Figs. 16 and 17 are similar views showing the secondary circuit arranged in a somewhat different manner.

The motor represented in Fig. 1 is the same as that shown in another application filed by me April 13, 1889, Serial No. 307,139, and no claim is therefore made herein upon the motor proper.

I have discovered that a motor of this character operates efficiently when alternating currents are passed through it.

Z Z represents the leads from an alternating generator furnishing high-tension currents, and Z' is a reducing-converter whose primary is connected between said leads. The secondary $z'$ is led to the brushes bearing upon the contact-plates $h'$ $h^2$ of the reciprocating switch-bar H. Five contact-rollers $a$ $b$ $z$ $c$ $d$ bear upon the contact-plates $h'$ $h^2$. Wires from the contact-rollers lead to the solenoids A B C D the roller $a$ being connected with the outer end of the solenoid A, the roller $b$ with the adjoining ends of the solenoids A and B, $z$ with the adjoining ends of the solenoids B and C, $c$ with the adjoining ends of the solenoids C and D, and $d$ with the outer end of the solenoid D. With this organization and the parts in the position indicated in this figure the solenoids B and C are energized, A and D being short-circuited. As the armature E moves forward and as the switch-bar H is correspondingly moved by the rod or switch-lever H', the solenoids C and D are next energized and the armature completes its stroke. On the return of the armature, first B and C are active and then A and B. I have found that the alternating current in the secondary of the converter effects the successful operation of a motor of this character.

In Figs. 2, 3, 4, 7, and 12 I have shown an organization in which the primary and secondary windings are both included in the machine. The motor here shown is of the vertical type, and is constructed in the following manner: F is a base-frame, which may be of cast-iron, and F' are uprights on each side thereof. $F^2$ is a driving-shaft carrying driving wheels or pulleys $F^3$ $F^3$. The crankpin $f$ on each wheel is connected by a connecting-rod $f'$ with a horizontal bar $F^4$, reciprocating vertically in ways in the standards F' and connected centrally with the piston-rod $F^5$, carrying the armature G. The armature G and the cylinder G', in which it reciprocates, are shown as rectangular in cross-section. The cores $p$ of the primary coils P P are arranged on opposite sides of the cylinder G'. The construction is plain from Figs. 4, 7, and 12. The secondary is wound in three independent solenoids A' B' C' around the two coils of the primary and the cylinder G' between them, and the terminals of these secondary coils are connected as presently described, and as shown in the diagrams. An eccentric I on the driving-shaft $F^2$ reciprocates the switch-bar I', as indicated in Fig. 3, the preferred details of construction of the switch mechanism being indicated in Figs. 9, 10, and 11. The bar I' reciprocates in bearings $i\ i$. Between the bearings the bar is composed of two slats $i'\ i'$ of wood or other suitable insulating material. These slats embrace and lie in recesses in the sides of two blocks $I^2$, composed of sections united by bolts $i^3$ and clamping the slats edgewise. By loosening the bolts, therefore, the blocks may be adjusted. Each block $I^2$ has upon its inner face a contact-plate or block K of suitable material—for instance, a block of carbon—that is clamped in place by side plates $k$, bolted to the inner section of the block $I^2$. Contact-fingers L, mounted upon a strip of wood or other insulating material, are arranged in such relation as to make contact with the plate K as the rod I' is reciprocated. These fingers are preferably pivoted as shown, and normally pressed outwardly by springs $l$, and are preferably formed with beveled ends. Two such fingers, side by side, make contact with each plate or block K. The connections are as indicated in the diagrams. In Fig. 12 the primary circuit Z and cores $p$ are shown.

The solenoids A' B' C', composing the secondary, are connected as follows: The outer end of A' is connected with one of the fingers of a pair and the adjoining ends of B' and C' with the other finger of that pair. The outer end of C' is connected with one of the fingers of another pair and the other finger of that pair is connected with the adjoining ends of A' and B'. Like connections are shown in Figs. 13, 14, and 15, (the primary being omitted,) and the operation is apparent from these diagrams. With the armature in the position shown in Fig. 13 the solenoids A' B' are on closed circuit in series and the armature is drawn forward. When it reaches the middle position, Fig. 14, there is a moment when all the solenoids will be closed; but as the armature continues its motion and completes its stroke, Fig. 15, A' is cut out and B' and C' are active and the armature moves in the opposite direction, the same operation being repeated.

In Figs. 16 and 17 the solenoids are differently connected, in that the wires leading from the adjoining ends of A' and B' and the ends of B' and C' are joined at $x$. The operation is similar to that just described, except that when either pair of brushes is on a contact-plate the middle solenoid B' is closed upon itself—that is, it is in multiple with the adjoining active solenoid A' or B' instead of in series with it. Two new forms of armature are shown.

In Figs. 7, 8, and 12 a hollow rectangular armature having longitudinal corrugations to increase the surface of iron is illustrated.

In Figs. 3, 5, and 6 a collapsible and expansible armature is shown, constructed as follows: It is rectangular and each side is composed of horizontal iron plates $g$, hinged at each edge at $g'$ to an adjoining plate, so as to expand and collapse like bellows. At the center of the armature is a rigid rectangular frame G', to which each half of the collapsible armature is secured. This construction gives horizontal corrugations that increase the surface of the armature, but it also has another function. At each end of the stroke the end of the armature next the cylinder-head is compressed, as seen in Figs. 5 and 6, and consequently a longer stroke of the piston is obtained than if the armature were rigid.

I claim as my invention—

1. In an electric motor to be operated by alternating current, the combination, substantially as set forth, of a primary circuit wound upon cores within the motor, the armature-actuating solenoid, secondary coils wound in suitable relation to the primary circuit, switch mechanism controlling said secondary coils, and a reciprocating armature arranged within the secondary coils and actuated thereby.

2. In an electric motor to be actuated by alternating currents, the combination of a reciprocating armature, the cylinder within which it moves, cores $p$ on opposite sides of said cylinder, the primary circuit wound in coils upon said cores, the secondary circuit wound in coils surrounding the primary coils, and cylinder and switch mechanism.

3. In an electric motor to be operated by alternating currents, the combination, substantially as set forth, of a reciprocating armature, the series of solenoids acting thereon in pairs and included in a secondary circuit, contact-plates, as K K, pairs of contact-fingers, as L L, and circuit-connections, as shown, between the contact-fingers and solenoids.

4. The combination, substantially as set forth, with the actuating-solenoids, of an armature having corrugations to increase the metal surface.

5. The combination, substantially as set forth, with the actuating-solenoids, of the expansible and collapsible armature, for the purpose described.

6. The combination, substantially as set forth, with the actuating-coils, of the piston-rod and an armature carried thereby and composed of iron plates arranged transversely to the piston and hinged together at their edges, for the purpose described.

7. The combination, substantially as set forth, with the reciprocating switch-bar composed in part of strips or slats of insulating material, as $i'$, of the adjustable block $I^2$, carrying contact-plates K, and the pivoted insulated spring contact-fingers.

8. The combination, substantially as set forth, with the insulating slats or strips $i'$, of the recessed sectional block carrying contact-plates K.

9. The combination, substantially as set forth, of the vertical cylinder, the actuated solenoids wound around the cylinder, and the vertically-reciprocating expansible and collapsible armature.

In testimony whereof I have hereunto subscribed my name.

LEO BOCK, JR.

Witnesses:
W. D. BALDWIN,
MAMIE J. KELLEY.